(12) United States Patent
Lee et al.

(10) Patent No.: US 9,478,032 B2
(45) Date of Patent: Oct. 25, 2016

(54) IMAGE MONITORING APPARATUS FOR ESTIMATING SIZE OF SINGLETON, AND METHOD THEREFOR

(71) Applicant: SK TELECOM CO., LTD., Seoul (KR)

(72) Inventors: Gwang-gook Lee, Seongnam-si (KR); Hee-yul Lee, Daegu (KR); Ki-mun Kim, Seongnam-si (KR)

(73) Assignee: SK TELECOM CO., LTD., Seoul (KR)

(*) Notice: Subject to any disclaimer, the term of this patent is extended or adjusted under 35 U.S.C. 154(b) by 48 days.

(21) Appl. No.: 14/682,805

(22) Filed: Apr. 9, 2015

(65) Prior Publication Data

US 2015/0213595 A1  Jul. 30, 2015

Related U.S. Application Data

(63) Continuation of application No. PCT/KR2013/008596, filed on Sep. 25, 2013.

(30) Foreign Application Priority Data

Oct. 9, 2012 (KR) .................. 10-2012-0112077

(51) Int. Cl.
*G06K 9/34* (2006.01)
*G06T 7/00* (2006.01)
(Continued)

(52) U.S. Cl.
CPC ............ *G06T 7/004* (2013.01); *G06K 9/00369* (2013.01); *G06T 5/002* (2013.01);
(Continued)

(58) Field of Classification Search
CPC ..... G06K 9/00369; G06T 5/002; G06T 5/40; G06T 7/0018; G06T 7/004; G06T 7/0081; G06T 7/602; G06T 2207/10004; G06T 2207/20144; G06T 2207/20148; G06T 2207/30196; G06T 2207/30232; G06T 2210/12; H04N 7/18

USPC ........ 382/103, 107, 236, 173; 348/169, 170, 348/171, 172, 352
See application file for complete search history.

(56) References Cited

U.S. PATENT DOCUMENTS 7,733,524 B2 * 6/2010 Huang ............... G06K 9/00456
358/1.9
9,311,719 B2 * 4/2016 Lee ....................... G06T 7/0042
(Continued)

FOREIGN PATENT DOCUMENTS

JP  2010102586 A  5/2010
JP  2012138906 A  7/2012
(Continued)

OTHER PUBLICATIONS

International Search Report for PCT/KR2013/008596 dated Jan. 6, 2014.

*Primary Examiner* — Mekonen Bekele
(74) *Attorney, Agent, or Firm* — Hauptman Ham, LLP

(57) ABSTRACT

An image monitoring apparatus includes a foreground/background separator generating a foreground image by removing background pixels exhibiting no movement from pixels in an image and separating foreground pixels representing pixels of a moving object from the pixels; a foreground object information generator generating foreground object information containing a coordinate value of each of one or more foreground objects included in the foreground image and the number of pixels of the foreground objects; an clustering unit clustering the foreground object information into a plurality of groups; a singleton information detector determining at least one group from the plurality of groups as a group of singletons, and detecting singleton information on the singletons; and a singleton estimation calculator estimating a predetermined area calculation function using the singleton information and calculate at least one of estimates with respect to an area, a width and a height of each of the singletons.

22 Claims, 9 Drawing Sheets

(51) Int. Cl.
*H04N 7/18* (2006.01)
*G06T 7/60* (2006.01)
*G06K 9/00* (2006.01)
*G06T 5/00* (2006.01)
*G06T 5/40* (2006.01)

(52) U.S. Cl.
CPC .............. *G06T 5/40* (2013.01); *G06T 7/0018* (2013.01); *G06T 7/0081* (2013.01); *G06T 7/602* (2013.01); *H04N 7/18* (2013.01); *G06T 2207/10004* (2013.01); *G06T 2207/20144* (2013.01); *G06T 2207/20148* (2013.01); *G06T 2207/30196* (2013.01); *G06T 2207/30232* (2013.01); *G06T 2210/12* (2013.01)

(56) References Cited

U.S. PATENT DOCUMENTS

| | | | |
|---|---|---|---|
| 2009/0067709 A1* | 3/2009 | Gross | H04N 1/40062 382/166 |
| 2010/0134614 A1* | 6/2010 | Aman | A63B 24/0003 348/135 |
| 2015/0213624 A1* | 7/2015 | Lee | G06T 7/0042 382/103 |

FOREIGN PATENT DOCUMENTS

| | | |
|---|---|---|
| KR | 1020070065480 A | 6/2007 |
| KR | 1020080099296 A | 11/2008 |
| KR | 1020090119668 A | 11/2009 |
| KR | 101020090132339 A | 12/2009 |
| KR | 1020120104711 A | 9/2012 |

* cited by examiner (a) (b)

IMAGE MONITORING APPARATUS FOR ESTIMATING SIZE OF SINGLETON, AND METHOD THEREFOR

CROSS-REFERENCE TO RELATED APPLICATION

The present application is a continuation of International Patent Application No. PCT/KR2013/008596, filed Sep. 25, 2013, which is based on and claims priority to Korean Patent Application No. 10-2012-0112077, filed on Oct. 9, 2012. The disclosures of the above-listed applications are hereby incorporated by reference herein in their entirety.

TECHNICAL FIELD

The present disclosure in one or more embodiments relates to an image surveillance or monitoring apparatus and method for estimating the size of a singleton.

BACKGROUND

The statements in this section merely provide background information related to the present disclosure and do not necessarily constitute prior art.

Sizes of objects in an image are often used to enhance accuracy of an image analysis algorithm of an image monitoring system. For example, when only humans are set as objects-of-interest, approximate sizes of humans are preset in the system such that nonhuman objects (animals, vehicles, etc.) are excluded from target objects to detect.

The inventor(s) has noted that to estimate the size of an object, precise camera calibration is needed. The inventor(s) has noted that such precise camera calibration requires complex processing and is thus not proper for practical use.

The inventor(s) has noted that the size of an object in an image on the image monitoring system varies depending on the coordinates thereof in the image due to perspective effect. The inventor(s) has noted that known technology involves a user in person to input the size of an object-of-interest at a few different points in an image, perform interpolation on the object size information inputted in order to estimate and use the size of the object at each coordinate in the image.

The inventor(s) has noted that the result obtained through this method varies according to the sample that the user inputs, and therefore the accuracy of the system depends on the competence level of the user. The inventor(s) has experienced that to apply the method requiring inputs from the user to a large-scale system which employs multiple cameras, a lot of labor is necessary.

SUMMARY

In accordance with some embodiments of the present disclosure, an image monitoring apparatus comprises a foreground/background separator, a foreground object information generator, an clustering unit, a singleton information detector and a singleton estimation calculator. The foreground/background separator is configured generate a foreground image by removing background pixels exhibiting no movement from pixels in an image and separating foreground pixels representing pixels of a moving object from the pixels in the image. The foreground object information generator is configured to generate foreground object information containing a coordinate value of each of at least one foreground object included in the foreground image and the number of pixels of the foreground object. The clustering unit is configured to cluster the foreground object information into a plurality of groups. The singleton information detector is configured to determine at least one group from the plurality of groups as a group of singletons and to detect singleton information on the singletons. And a singleton estimation calculator is configured to estimate a predetermined area calculation function using the singleton information and to calculate at least one of estimates with respect to an area, a width and a height of each of the singletons.

In accordance with another embodiment of the present disclosure, an apparatus for monitoring video images by estimating the size of an object is configured to capture at least one image; identify a pixel value of at least one pixel in the captured image based on a predetermined criterion; perform foreground image separation including: separating foreground pixels by removing background pixels designated based on the pixel value; and generating a foreground image including the foreground pixels corresponding to at least one foreground object; generate foreground object information by measuring coordinate values of the foreground pixels and the number of pixels of the foreground object in the captured image; clustering the foreground object information into a plurality of groups; detecting singleton information on singletons by determining at least one group of the plurality of groups as a group for the singletons; and performing a singleton estimation calculation including: estimating a predetermined area calculation function using the singleton information, and calculating at least one of estimates with respect to an area, a width and a height of each of the singletons using coordinate values contained in the singleton information.

DETAILED DESCRIPTION

Figure 1:
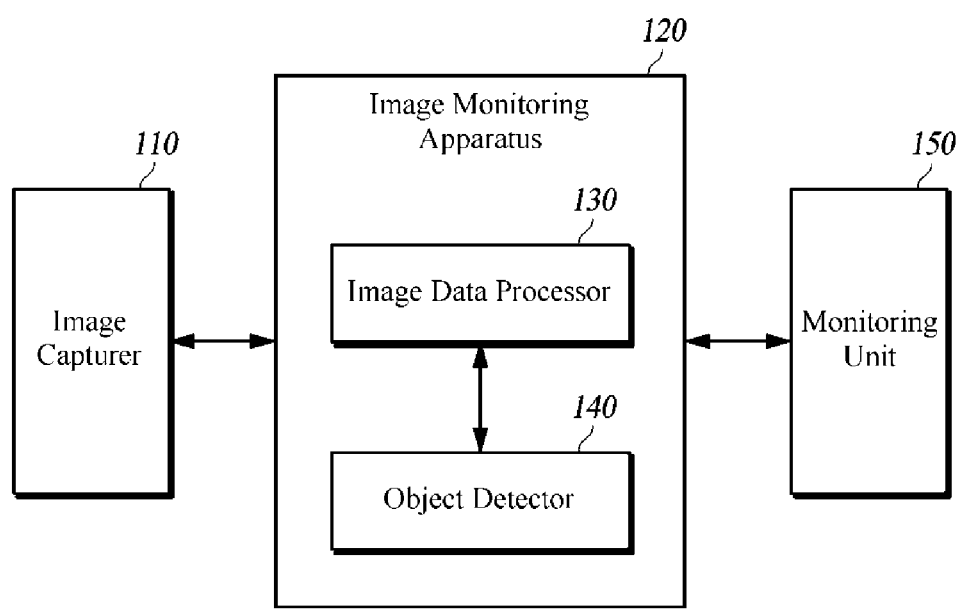
FIG. 1 is a schematic block diagram of an apparatus for monitoring video images by using the size of an object, according to at least one embodiment of the present disclosure.

Some embodiments of the present disclosure provide an image monitoring apparatus and method, which generate object information on moving foreground objects in video images captured by an image capturer, perform denoising and clustering based on the generated object information and perform detection of a singleton from the clustered objects, and estimate the area and the size of the singleton using a predetermined function.

Hereinafter, various embodiments of the present disclosure will be described in detail with reference to the accompanying drawings. In the following description, like reference numerals designate like elements, although the elements are shown in different drawings. Further, in the following description of the at least one embodiment, a detailed description of known functions and configurations incorporated herein will be omitted for the purpose of clarity and for brevity.

Additionally, in describing the components of the present disclosure, terms like first, second, A, B, (a), and (b) are used. These are solely for the purpose of differentiating one component from another, and one of ordinary skill would understand that the terms are not to imply or suggest the substances, order or sequence of the components. If a component is described as "connected", "coupled", or "linked" to another component, one of ordinary skill in the art would understand the components are not necessarily directly "connected", "coupled", or "linked" but also are indirectly "connected", "coupled", or "linked" via a third component.

FIG. 1 is a schematic block diagram of an apparatus for monitoring video images by using the size of an object, according to at least one embodiment of the present disclosure.

According to some embodiments of the present disclosure, an apparatus for monitoring images by using the size of an object includes an image capturer 110, an image monitoring apparatus 120 and a monitoring unit 150. Herein, the image monitoring apparatus 120 includes an image data processor 130 and an object detector 140. Other components of the apparatus for monitoring images, such as each of the image capturer 110, the image monitoring apparatus 120 and the monitoring unit 150 are implemented by, or includes, one or more processors and/or application-specific integrated circuits (ASICs). The apparatus for monitoring images comprises input units such as one or more buttons, a touch screen, a mic and so on, and output units such as a display, an indicator and so on.

The image capturer 110 refers to a device capable of capturing images. The image capturer 110 is implemented as a closed-circuit television (CCTV) camera, a video surveillance camera, and the like which are capable of capturing images to monitor moving objects of predetermined sizes. The image capturer 110 transmits the captured images to the image monitoring apparatus 120 in order to monitor moving objects in the captured images. An image captured by the image capturer 110 is one frame. However, embodiments of the present disclosure are not limited thereto. The captured image includes a plurality of frames.

The image monitoring apparatus 120 is a device for receiving the captured images from the image capturer 110 and monitoring the images by detecting whether there is a moving object of a predetermined size in the captured images.

The image data processor 130 receives a captured image from the image capturer 110, identifies pixel values of the pixels in the captured image, and generates a foreground image through separating foreground pixels of the moving objects from the captured image by removing background pixels of a background, which does not exhibit a designated movement, in the captured image. In addition, the image data processor 130 generates foreground object information by measuring (i) the number of pixels of the foreground objects in the separated foreground image and (ii) coordinate values of the foreground pixels. Herein, when the amount of data of the foreground object information is less than a predetermined reference data amount, the image data processor 130 repeatedly measures (i) the number of pixels of the foreground objects and (ii) the coordinate values of the foreground pixels based on a predetermined time and data amount to generate the foreground object information. Herein, in some embodiments of the present disclosure, a "foreground object" indicates generally a moving object in a captured image as opposed to so-called "background image." And "foreground pixels" indicates pixels of the foreground object corresponding to the moving object in the captured image. Further, "foreground objects" correspond to a plurality of moving objects in the captured image.

The object detector 140 denoises the foreground object information generated by the image data processor 130, and clusters the denoised foreground object information into two groups by using the foreground object information. Then, the object detector 140 determines whether a group including singletons exists among the two groups and detects singleton information on the singletons included in the determined group. In addition, the object detector 140 estimates a predetermined area calculation function by using the singleton information. Then, the object detector 140 calculates an area, a width, and a height of each singleton by applying the y coordinate values of the singletons contained in the singleton information and transmits the calculated area, the calculated width, and the calculated height of said each singleton to the monitoring unit 150 such that the size of the singleton is displayed.

The monitoring unit 150 refers to a device on which each singleton of the singletions is displayed by using the area, the width and the height of each singleton respectively calculated by the image monitoring apparatus 120. Herein, the singleton is highlighted and displayed in the shape of one of various figures such as a quadrangle, an oval and a triangle based on the width and the height of the singleton. While the monitoring unit 150 is illustrated as displaying only singletons, the object to be displayed is varied according to configurations established by, for example, the administrator's initiated setup value or a default setup value. In addition, the monitoring unit 150 is implemented so as to perform short-range communication through, for example, Wireless LAN, Bluetooth, or ZigBee to receive information on the singletons from the image monitoring apparatus 120. While the monitoring unit 150 is illustrated as being implemented independent of the image monitoring apparatus 120 in FIG. 1, embodiments of the present disclosure are not limited thereto. The monitoring unit 150 and the image monitoring apparatus 120 are implemented by a single device with a display incorporated into the image monitoring apparatus 120.

Figure 2:
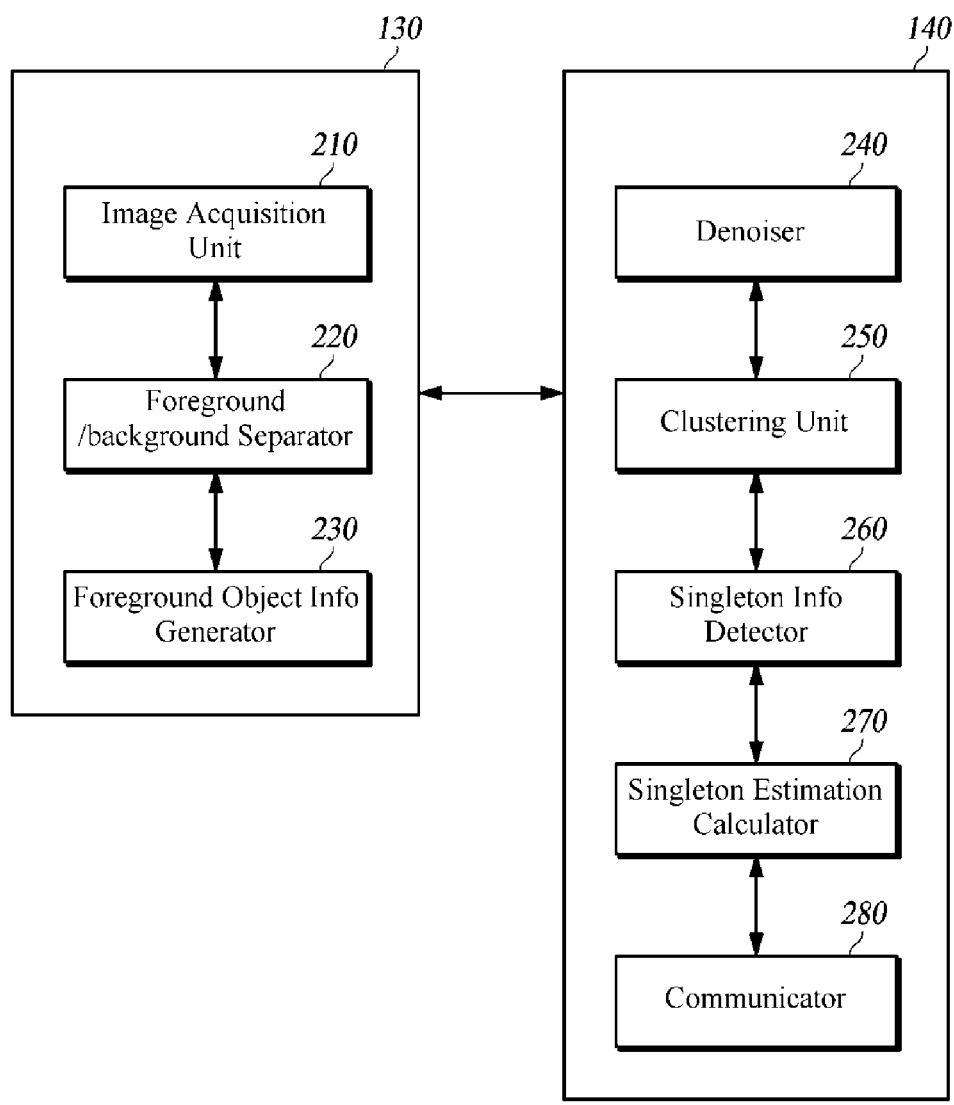
FIG. 2 is a block diagram of an image monitoring apparatus according to at least one embodiment.

FIG. 2 is a block diagram of an image monitoring apparatus according to at least one embodiment.

The image monitoring apparatus 120 includes an image acquisition unit 210, a foreground/background separator 220, a foreground object information generator 230, a denoiser 240, a clustering unit 250, a singleton information detector 260, a singleton estimation calculator 270 and a communicator 280. Other components of the image monitoring apparatus 120, such as each of the image acquisition unit 210, the foreground/background separator 220, the foreground object information generator 230, the denoiser 240, the clustering unit 250, the singleton information detector 260, the singleton estimation calculator 270 and the communicator 280 are implemented by, or includes, one or more processors and/or application-specific integrated circuits (ASICs). The image monitoring apparatus 120 comprises input units such as one or more buttons, a touch screen, a mic and so on, and output units such as a display, an indicator and so on.

The image acquisition unit 210 acquires an image captured by the image capturer 110 which is connected to the image monitoring apparatus 120. Herein, the captured image is constituted by one frame or a plurality of frames. While the image acquisition unit 210 is illustrated as acquiring images captured by the image capturer 110 by directly receiving the images, various embodiments of the present disclosure are not limited thereto. The image acquisition unit 210 is also used to acquire an image pre-captured and stored by the image capturer 110 to estimate the size of an object in the image.

The foreground/background separator 220 separates foreground pixels corresponding to one or more moving objects from among all the pixels in the captured image by removing background pixels corresponding to a motionless background in the captured image. More specifically, the foreground/background separator 220 generates a background model by designating pixels which have not changed from the previously captured image as background pixels, and compares a captured image acquired by the image acquisition unit 210 with the background model to separate pixels which do not correspond to the background model from among all the pixels of the captured image and determine the separated pixels as foreground pixels (i.e. corresponding to pixels of the moving objects in the captured image). The foreground/background separator 220 generates a foreground image (i.e., an image corresponding to foreground objects in the captured image) showing only the moving objects by using multiple separated foreground pixels. Herein, the foreground/background separator 220 separates the foreground image corresponding to the moving objects by setting a region corresponding to the background pixels into 0 and the foreground pixels for the moving objects into 1 among the pixels in the captured image.

The foreground/background separator 220 also separates the foreground pixels by using a Gaussian mixture model (GMM). The foreground/background separator 220 designates pixels having a plurality of Gaussian modes with weights greater than a predetermined reference value as background pixels, and separates the foreground pixels corresponding to the moving objects from among all the pixels of the captured image by removing the designated background pixels. For example, when there are multiple persons moving across a captured image, the foreground/background separator 220 measures weights of the Gaussian modes, designates background pixels for the static background having high weights, and separates foreground pixels corresponding to the multiple persons by removing the designated background pixels from among the pixels of the captured image. Thereby, the foreground/background separator 220 generates a foreground image for the multiple moving persons.

The foreground object information generator 230 generates foreground object information by measuring the number of pixels and the coordinate values of the foreground objects in the foreground image separated by the foreground/background separator 220. Herein, the foreground object information generator 230 measures the number of pixels for each foreground object in the foreground image, and uses the measured number of pixels as the area of the corresponding foreground object.

The foreground object information generator 230 measures the center point of the minimum bounding box of the foreground object for the coordinate value of the foreground object, but various embodiments of the present disclosure are not limited thereto. The coordinate value of a predetermined point present at the edge of the minimum bounding box of the foreground object is measured for the coordinate value of the foreground object. Herein, the coordinate value of the foreground object is a y coordinate necessary for identifying perspective of the foreground object. The bounding box is a rectangular shape, but embodiments of the present disclosure are not limited thereto. The bounding box has other shapes such as an ellipse, a circle, a triangle, and the like.

Meanwhile, the foreground object information generator 230 determines whether image monitoring can be performed by using the foreground object information. When the data amount is less than a predetermined reference data amount, the foreground object information generator 230 repeatedly measures the number of pixels of the foreground objects and the coordinate values of the foreground objects based on a predetermined time and volume of data or data amount to generate foreground object information. For example, when the foreground object information includes data for 500 foreground objects or more, and the maximum information collection time is set to 5 minutes, then 500 or more pieces of foreground object information are generated, or the foreground object information generated after five minutes of the information collection time are used for image monitoring.

The denoiser 240 removes a noise in the foreground object information whose size cannot be measured or need not be measured.

According to some embodiments of the present disclosure, the denoiser 240 removes the noise through denoising by using an area histogram of the foreground objects or through denoising by using the coordinate values included in the foreground object information.

The denoiser 240 determines a foreground object as a noise when the area of the foreground object, represented by the number of pixels of the foreground object, is less than a predetermined amount, and remove the are of the determined noise. For example, the denoiser 240 compiles histogram based statistics on the number of pixels of each foreground object included in the foreground object information. If the number of pixels of a foreground object is within a preset range or less than a predetermined reference pixel value, the denoiser 240 determines the pixels as noise and remove the determined pixels from the foreground object information.

In another case, the denoiser 240 determines a foreground object as noise and remove the determined noise based on the coordinate value of the foreground object when what is visible in the captured image is not the whole shape of the foreground object but a portion thereof with its upper, lower, left or right edge of the foreground object cropped out of the captured image.

The clustering unit 250 clusters the denoised foreground object information into two groups. More specifically, the clustering unit 250 clusters the denoised foreground object information into two groups by using the value of at least one of image features including an aspect ratio for the foreground object information, a fill ratio of the foreground object information and a second moment in order to determine information on a singleton constructed by a single object in the denoised foreground object information. Herein, the aspect ratio for the foreground object information refers to the ratio of the width of the minimum bounding box to the height of the minimum bounding box, and the fill ratio of the foreground object information refers to a value calculated by dividing the total number of pixels of a denoised foreground object by the number of pixels included in the corresponding minimum bounding. The second moment refers to a value calculated using the coordinate values of the pixels included in the foreground object. The second moment M is calculated using Equation 1 below.

$$M = \begin{vmatrix} \mu_{00} & \mu_{01} \\ \mu_{10} & \mu_{11} \end{vmatrix}$$

$$= \frac{1}{N} \begin{vmatrix} \sum (x-x_0)^2(x-x_0)^2 f(x,y) & \sum (x-x_0)^2(y-y_0)^2 f(x,y) \\ \sum (x-x_0)^2(y-y_0)^2 f(x,y) & \sum (y-y_0)^2(y-y_0)^2 f(x,y) \end{vmatrix}$$

Equation 1

Herein, M denotes the second moment, μ denotes an average of coordinate values of the foreground pixels included in a foreground object, N denotes the number of pixels of the foreground object, (x, y) denotes the coordinates of pixels in the foreground image, and (x0, y0) denotes the coordinates of the centroid of the foreground object, and f(x, y) is 1 (foreground) or 0 (background).

Herein, the second moment M is calculated by using the determinant for the average of the coordinate values of the foreground pixels included in the foreground object.

According to some embodiments of the present disclosure, the clustering unit 250 divides at least one of the aspect ratio and the fill ratio of the foreground object and the second moment into two groups by using the k-means clustering method. However, embodiments of the present disclosure are not limited thereto. Any clustering method is used, including, for example, a hierarchical clustering method, a non-hierarchical clustering method and a model-based method which can divide the foreground object into a predetermined number of groups by using predetermined features. Herein, the k-means clustering method refers to a method for setting an initial value for clustering the foreground object into two groups and creating similar groups by using at least one of the aspect ratio for the foreground pixels, the fill ratio of the foreground object and the second moment. Since the k-means clustering method is widely used, a more detailed description thereof will be omitted.

The singleton information detector 260 determines a singleton group including singletons between two groups generated through clustering, and detects singleton information. More specifically, the singleton information detector 260 estimates a predetermined linear function representing a relationship between the y coordinates of the foreground pixels clustered by the clustering unit 250 and the number of pixels of the foreground objects by using a least-squares method, and calculates an average error for the number of pixels in each group by using the number of pixels of the foreground objects estimated with the predetermined linear function and the actual number of pixels of the foreground objects to determine a group having the smaller error as a group including singletons. Thereby, the singleton information detector 260 detects the information on the singletons in the determined group.

The predetermined linear function representing a relationship between the y coordinates of the foreground pixels clustered by the singleton information detector 260 and the number of pixels of a corresponding foreground object is defined by Equation 2 below.

$$a = p_1 + p_2 \lambda y$$

Equation 2

Herein, 'a' denotes an estimated number of pixels of the foreground object, p1 denotes the a-intercept of the predetermined linear function, p2 denotes the slope of the predetermined linear function, and y denotes y coordinates of foreground pixels.

The singleton information detector 260 estimates the number of pixels of a foreground object by substituting y coordinates of foreground pixels into Equation 2. Herein, the singleton information detector 260 calculates an error for the number of pixels of each foreground object using the calculated number of pixels of each foreground object and the actual number of pixels of each foreground object, determines one group having the smaller error for the number of pixels than the other group as a group including singletons by comparing average errors for the number of pixels in the two groups, and detects singleton information on the singletons included in the determined group. Herein, the singleton information includes the coordinates of pixels of the singleton and the number of pixels of the singleton.

The average error $e_c$ of errors for the number of pixels of the foreground objects included in each group is calculated using Equation 3.

$$e_c = \frac{1}{N_c} \sum_{i=1}^{N_c} \{a_i - (p_1 + p_2 \times y_i)\}^2$$

Equation 3

Herein, $e_c$ denotes an average error for the number of pixels of foreground objects, $N_c$ denotes the number of foreground objects in Group c, $a_i$ denotes the actual number of pixels of the foreground objects, and $p_1 + p_2 \times y_i$ denotes the number of pixels of the foreground objects estimated in Equation 1.

The singleton estimation calculator 270 estimates a predetermined nonlinear function for the singleton information detected by the singleton information detector 260 using nonlinear optimization, and calculates an estimate of the size of each singleton based on the predetermined nonlinear function. More specifically, the singleton estimation calculator 270 estimates a predetermined nonlinear function representing a relationship between y coordinates of the pixels of a singleton included in the singleton information and the number of pixels of the singleton through nonlinear optimization, and calculates the area of the singleton using the predetermined nonlinear function. Herein, estimates of the width of the singleton and the height of the singleton corresponding to the size of the singleton are calculated based on the predetermined nonlinear function for calculating the area of the singleton.

Meanwhile, the singleton estimation calculator 270 uses nonlinear optimization since the relationship between the y coordinates of pixels of a singleton and the number of pixels of the singleton are nonlinear depending on performance of the lens, the viewing angle and the installation angle of the image capturer 110. However, embodiments of the present disclosure are not limited thereto. The singleton estimation calculator 270 uses linear optimization.

The predetermined nonlinear function for a relationship between the y coordinates of the pixels of a singleton included in the singleton information and the number of pixels of the singleton, which is estimated by the singleton estimation calculator 270, is given as Equation 4 below.

$$a = p_{a1} + p_{a2} \times y^{p_{a3}} \qquad \text{Equation 4}$$

Herein, a denotes an estimated area of a singleton, $p_{a1}$ denotes the a-intercept of the predetermined nonlinear function, $p_{a2}$ denotes a coefficient of the predetermined nonlinear function, $p_{a3}$ denotes the curvature of the predetermined nonlinear function, and y denotes y coordinates of the singleton.

In Equation 4, parameters $p_{a1}$, $p_{a2}$ and $p_{a3}$ are set to values that will minimize an error $e_a$ calculated in Equation 5 below using nonlinear optimization.

$$e_a = \frac{1}{N_c} \sum_{i=1}^{N_c} \{a_i - (p_{a1} + p_{a2} \times y^{p_{a3}})\}^2 \qquad \text{Equation 5}$$

Herein, $e_a$ denotes an error for the number of pixels in the singleton group, $N_c$ denotes the number of foreground objects in the singleton group, $a_i$ denotes an actual number of pixels of each foreground object in the singleton group, and $p_{a1} + p_{a2} \times y^{p_{a3}}$ denotes the number of pixels of the foreground objects in the singleton group estimated in Equation 4.

A function with which the singleton estimation calculator 270 calculates the width of the singleton corresponding to the size of the singleton based on Equation 4 is defined by Equation 6 below.

$$w = p_{w1} p_{w2} \times y^{p_{w3}} \qquad \text{Equation 6}$$

Herein, w denotes the width of a singleton corresponding to the size of the singleton, $p_{w1}$ denotes the w-intercept of the function for calculating the width, $p_{w2}$ denotes a coefficient of the function for calculating the width, $p_{w3}$ denotes the curvature of the function for calculating the width, and y denotes y coordinates of the singleton.

In calculating the width of the singleton, the singleton group used to estimate the area of the singleton in Equation 4 is used. However, embodiments of the present disclosure are not limited thereto. Only singletons for which the difference between the actual area and the estimated area is less than or equal to a predetermined threshold are selectively used. For example, only when the difference between the actually measured area $a_i$ of object i and the area a estimated in Equation 4 is less than or equal to 10%, the width and the height of the object and estimated.

In Equation 6, parameters $p_{w1}$, $p_{w2}$ and $p_{w3}$ are set to values that will minimize an error $e_w$ calculated in Equation 7 below through nonlinear optimization.

$$e_w = \frac{1}{N_a} \sum_{i=1}^{N_a} \{w_i - (p_{w1} + p_{w2} \times y^{p_{w3}})\}^2 \qquad \text{Equation 7}$$

Herein, $e_w$ denotes a width error in the singleton group, $N_a$ denotes the number of foreground objects in the singleton group for which the error for the number of pixels is less than or equal to a threshold, $w_i$ denotes the actual widths of the foreground objects in the singleton group, and $p_{w1} + p_{w2} \times y^{p_{w3}}$ denotes the widths of the foreground objects for which the error for the number of pixels is less than or equal to the threshold in the singleton group estimated in Equation 6.

A function with which the singleton estimation calculator 270 calculates the height of each singleton corresponding to the size of the singleton based on Equation 4 is defined by Equation 8 below.

$$h = p_{h1} + p_{h2} \times y^{p_{h3}} \qquad \text{Equation 8}$$

Herein, h denotes the height of a singleton corresponding to the size of the singleton, $p_{h1}$ denotes the h-intercept of the function for calculating the height, $p_{h2}$ denotes a coefficient of the function for calculating the height, $p_{h3}$ denotes the curvature of the function for calculating the height, and y denotes y coordinates of the singleton.

In Equation 8, parameters $p_{h1}$, $p_{h2}$ and $p_{h3}$ are set to values that will minimize an error $e_h$ calculated in Equation 9 below through nonlinear optimization.

$$e_h = \frac{1}{N_a} \sum_{i=1}^{N_a} \{h_i - (p_{h1} + p_{h2} \times y^{p_{h3}})\}^2 \qquad \text{Equation 9}$$

Herein, $e_w$ denotes a height error in the singleton group, $N_a$ denotes the number of foreground objects in the singleton group for which the error for the number of pixels is less than or equal to a threshold, $h_i$ denotes the actual heights of the foreground objects in the singleton group, and $p_{h1} + p_{h2} \times y^{p_{h3}}$ denotes the heights of the foreground objects for which the error for the number of pixels is less than or equal to the threshold in the singleton group estimated in Equation 8.

The communicator 280 transmits at least one of estimates of the area, width and height of the singleton calculated by the singleton estimation calculator 270 to the monitoring unit 150 such that the monitoring unit 150 displays the singleton with the size of the singleton indicated by the at least one estimate.

Figure 3:
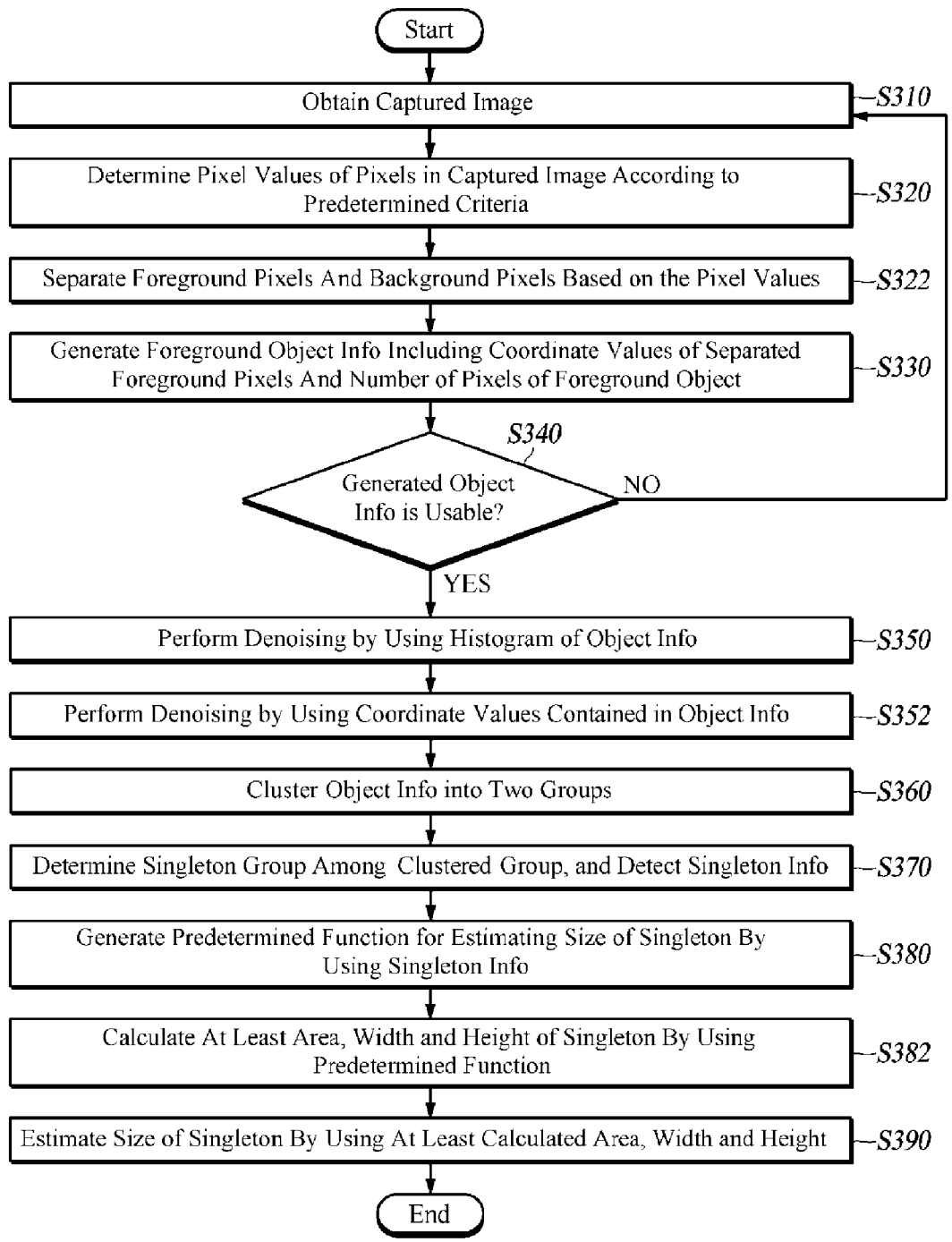
FIG. 3 is a flowchart of a method for monitoring video images by using the size of an object, according to at least one embodiment.

FIG. 3 is a flowchart of a method for monitoring video images by using the size of an object, according to at least one embodiment.

The image monitoring apparatus 120 acquires an image captured by the image capturer 110 or an image previously captured and stored (S310).

The image monitoring apparatus 120 identifies pixel values of the pixels in a captured image according to predetermined criteria (S320).

The image monitoring apparatus 120 separates background pixels for a background which does not exhibit a designated movement and foreground pixels for a moving object, based on the pixel values identified in step S320 (S322). Herein, the image monitoring apparatus 120 generates a background model by designating pixels which have not changed as background pixels based on a previously captured image, and compares an acquired captured image with the background model to determine and separate pixels which do not correspond to the background model as foreground pixels.

The image monitoring apparatus 120 generates foreground object information by measuring coordinate values of the foreground pixels separated in step S322 and the number of pixels of the foreground objects (S330). Herein, the image monitoring apparatus 120 repeatedly measures the number of pixels of the foreground objects and the coordinate values of the foreground pixels based on a preset time and data amount.

The image monitoring apparatus 120 determines whether the object information is usable for object sensing based on a predetermined time and an information amount (S340).

If the object information corresponds to preset reference information as a result of determination in step S340, the image monitoring apparatus 120 denoises the foreground objects using a histogram for the object information (S350), and then denoises the foreground object using the coordinate values included in the object information (S352).

The image monitoring apparatus 120 extracts features of the foreground objects using the object information and clusters the object information into two groups (S360).

The image monitoring apparatus 120 determines a singleton group between two groups generated in step S360, and detects singleton information on singletons (S370). Herein, the image monitoring apparatus 120 estimates a predetermined linear function representing a relationship between the y coordinates of the foreground pixels clustered by the clustering unit 250 and the number of pixels of the foreground objects using the least-squares method, compares the number of pixels of the foreground objects estimated using the predetermined linear function with the actual number of pixels of the foreground objects to determine a group having the smaller error of the two groups as a group including the singletons, and detects singleton information on the singletons.

The image monitoring apparatus 120 generates a predetermined function for estimation of the size of the singletons using the singleton information (S380). The image monitoring apparatus 120 generates a predetermined nonlinear function through nonlinear optimization of the singleton information.

The image monitoring apparatus 120 calculates the area, width, and height of a singleton using the singleton information (S382). Herein, the image monitoring apparatus 120 calculates the area, width and height of the singleton corresponding to the size of the singleton using the predetermined nonlinear function.

The image monitoring apparatus 120 estimates the size of the singleton by using the area, width and height of the singleton calculated in step S382 (S390). Herein, the singletons are highlighted and displayed in the shape of various figures such as a quadrangle, an oval and a triangle corresponding to the estimated sizes of the singletons using the monitoring unit 150.

Although it is described that Steps S310 to S390 are sequentially performed in FIG. 3, merely to illustrate the idea of the present disclosure in some embodiments, one of ordinary skill would understand that these steps can be performed in a modified sequence or two or more of Steps S310 to S390 can be performed in parallel without departing from the essential characteristics of the disclosure. Therefore, the steps in FIG. 3 are not limited to the time sequential manner.

Figure 4:
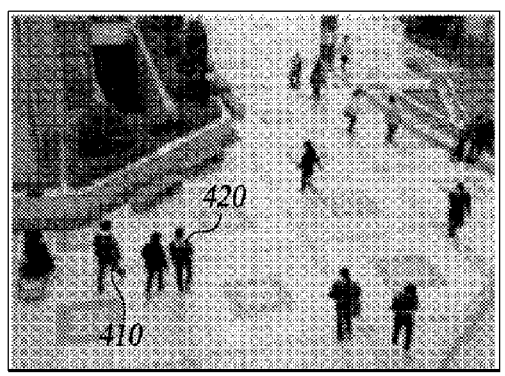
FIG. 4 is a diagram of an operation, performed by an image monitoring apparatus, for dividing a captured image into separate foreground pixels and background pixels, according to at least one embodiment.
Figure 4:
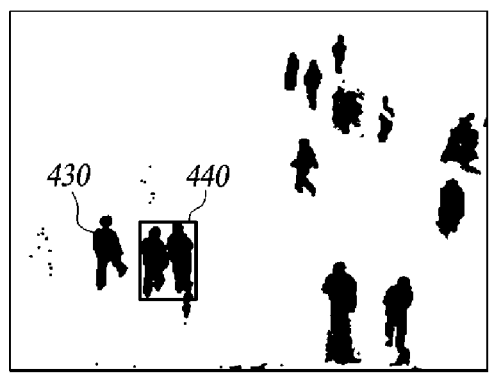

FIG. 4 is a diagram of an operation, performed by an image monitoring apparatus, for dividing a captured image into foreground pixels and background pixels by separating each other in a captured image, according to at least one embodiment.

FIG. 4(a) shows a captured image which the image monitoring apparatus 120 receives from the image capturer 110, and FIG. 4(b) shows a foreground image generated using only the foreground pixels after the image monitoring apparatus 120 removes the background pixels from the pixels of the captured image.

For example, FIG. 4(a) shows an image representing multiple pedestrians captured by a CCTV installed over a sidewalk in a city. Herein, a first object 410 represents a pedestrian walking alone, and a second object 420 represents two neighboring pedestrians walking together. The first object 410 and the second object 420 are displayed in the separated foreground image of FIG. 4(b) as a first foreground object 430 and a second foreground object 440. Herein, the image monitoring apparatus 120 determines, by performing clustering, that the first foreground object 430 is a singleton, and measures the coordinate value and the number of pixels of the first foreground object 430. On the other hand, the image monitoring apparatus 120 determines, by performing clustering, that the second foreground object 440 is not a singleton, and excludes the second foreground object 440 from singletons.

Figure 5:
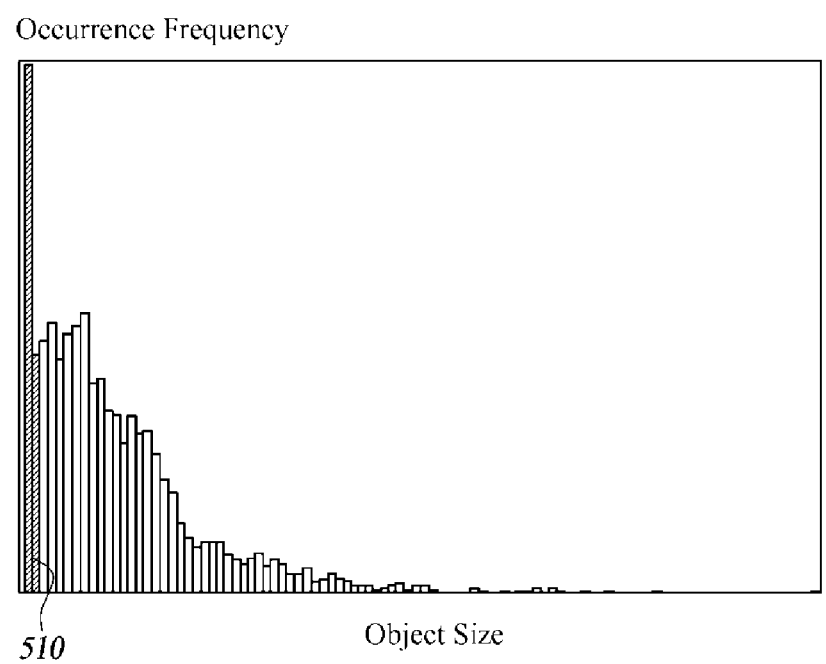
FIG. 5 is a diagram of a denoising operation, performed by a denoiser included in an image monitoring apparatus, using a histogram of foreground pixels, according to at least one embodiment.

FIG. 5 is a diagram of a denoising operation, performed by a denoiser included in an image monitoring apparatus, using a histogram of foreground pixels, according to at least one embodiment.

The denoiser 240 according to this embodiment generates an area histogram using the foreground object information on the foreground objects, and when the area in the generated histogram data is within a preset range or less than a predetermined reference value 510 (e.g., the lowest 5% of the histogram data), the denoiser 240 determines the foreground object information as noise and remove the same.

In the graph of FIG. 5, the x-axis represents object sizes (areas), and the y-axis represents occurrence frequencies. For example, the denoiser 240 removes small noises occurring in the image processing processes including image capture, conversion, separation, and calibration of a foreground image.

Figure 6:
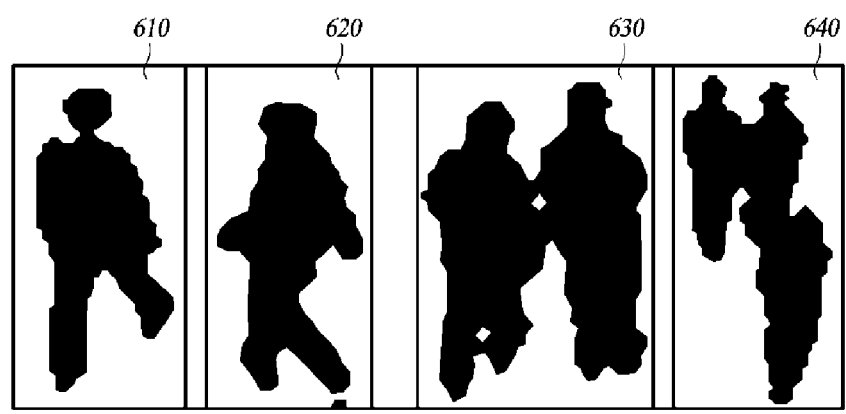
FIG. 6 is a diagram of an operation, performed by an image monitoring apparatus, for determining a singleton through clustering, according to at least one embodiment.

FIG. 6 is a diagram of an operation, performed by an image monitoring apparatus, for determining a singleton through clustering, according to at least one embodiment.

As shown in FIG. 6, when there are a first foreground object 610, a second foreground object 620, a third foreground object 630 and a fourth foreground object 640 in a foreground image, the image monitoring apparatus 120 divides the foreground objects into two groups using a preset clustering technique. Herein, one of the two groups refers to a singleton group, and the other refers to a group of foreground objects including one or more objects. For example, the first foreground object 610 and the second foreground object 620 are included in the singleton group, and the third foreground object 630 and the fourth foreground object 640 are included in a plurality-of-objects group. Herein, the image monitoring apparatus 120 calculates the areas of the singletons using only singleton information on the first foreground object 610 and the second foreground object 620 included in the singleton group and outputs the same through the monitoring unit 150.

Figure 7:
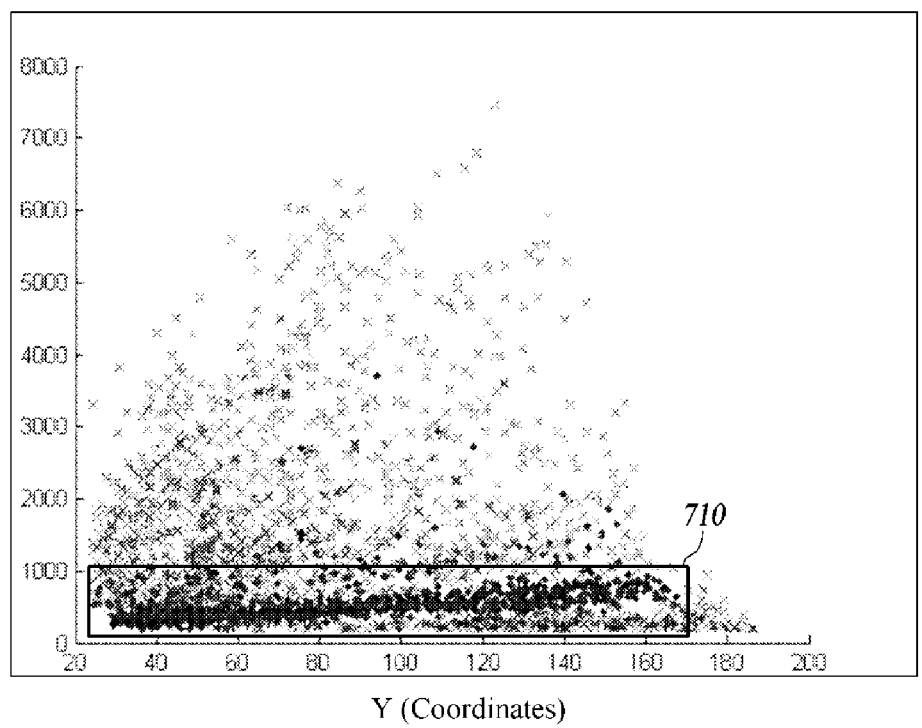
FIG. 7 is a graph of an outcome of clustering of foreground pixels for singleton detection performed by an image monitoring apparatus, according to at least one embodiment.

FIG. 7 is a graph of an outcome of clustering of foreground pixels for singleton detection performed by an image monitoring apparatus, according to at least one embodiment.

The graph of FIG. 7 shows an outcome of clustering of the foreground pixels included in a foreground image into two groups performed by the image monitoring apparatus 120 using the k-means clustering method. One of the two groups is indicated by "♦", and the other is indicated by "x".

As shown in FIG. 7, the image monitoring apparatus 120 estimates a predetermined linear function representing a relationship between the y coordinates of the clustered foreground pixels and the number of pixels of the foreground object using the least-squares method, and compare average errors for the number of pixels in the groups using the number of pixels of a foreground object estimated using the predetermined linear function and the actual number of pixels of the foreground object, thereby determining a group having the smaller error as a group 710 including singletons.

Figure 8:
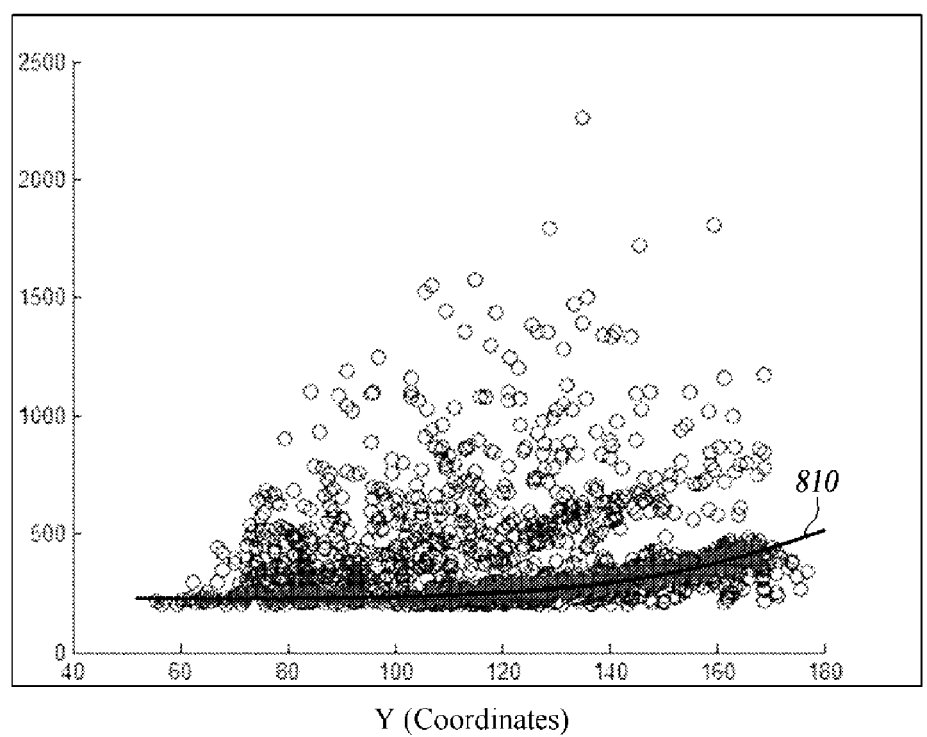
FIG. 8 is a graph of an operation, performed by an image monitoring apparatus, for calculating the area of a singleton, according to at least one embodiment.

FIG. 8 is a graph of an operation, performed by an image monitoring apparatus, for calculating the area of a singleton, according to at least one embodiment.

The graph shown in FIG. 8 represents an outcome of estimation of a predetermined nonlinear function 810 performed by the image monitoring apparatus 120 using nonlinear optimization for singleton information. All information related to the singleton information is indicated by "○", and information corresponding to an area of a singleton corresponding to the predetermined nonlinear function 810 is indicated by "●".

The image monitoring apparatus 120 calculates the width and height of the singleton corresponding to the size of the singleton based on the predetermined nonlinear function 810.

Figure 9:
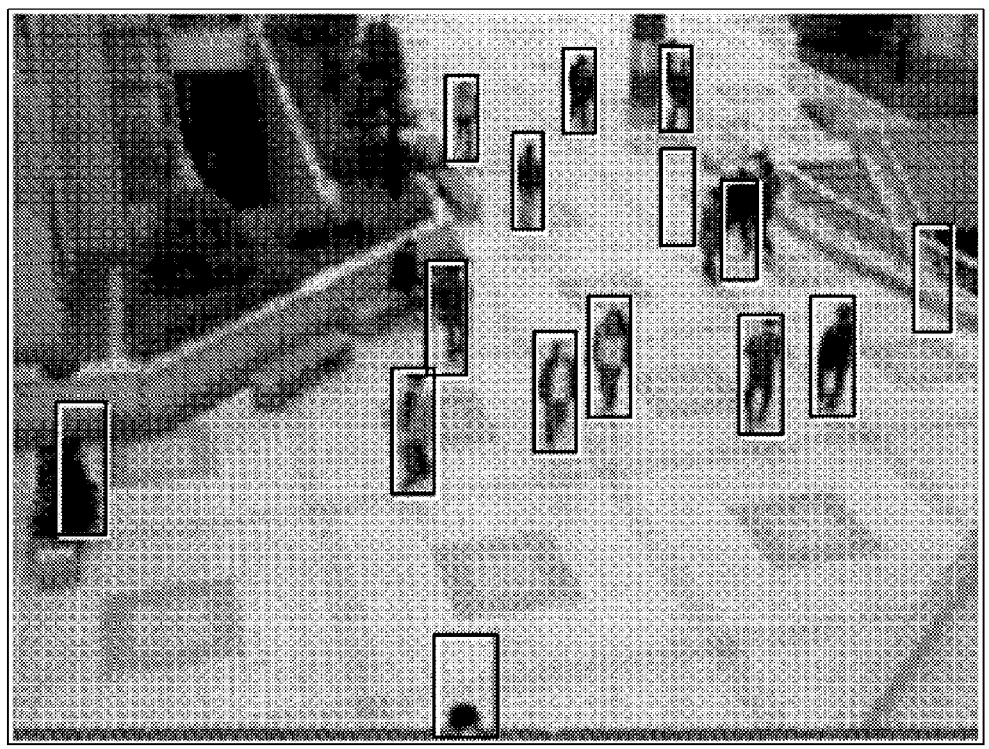
FIG. 9 is an exemplary resulting image output by estimating the size of a singleton with an image monitoring apparatus, according to at least one embodiment.

FIG. 9 is an exemplary resulting image output by estimating the size of a singleton with an image monitoring apparatus, according to at least one embodiment.

FIG. 9 shows a displayed image containing singletons indicated using the area, width and height of each singleton calculated by the image monitoring apparatus 120. Herein, the singletons are highlighted and displayed in a quadrangular shape using the widths and heights of the singletons as shown in FIG. 9.

According to some embodiments of the present disclosure as described above, object information on moving foreground objects in video images captured by an image capturer is generated, denoising and clustering are performed based on the generated object information and singletons are detected from the clustered objects, and at least one of the area, width and height of each of the singletons is estimated using a predetermined function. Thereby, a person does not need to directly designate the size of the objects. Accordingly, labor and time for the monitoring task is able to be reduced, and object monitoring is able to be more accurately performed than when the person directly designates the size of the objects. Further, images are sensed by excluding objects (e.g., animals, vehicles, etc.) other than the singletons (e.g., humans).

Although exemplary embodiments of the present disclosure have been described for illustrative purposes, those skilled in the art will appreciate that various modifications, additions and substitutions are possible, without departing from the spirit and scope of the claimed invention. Specific terms used in this disclosure and drawings are used for illustrative purposes and not to be considered as limitations of the present disclosure. Therefore, exemplary embodiments of the present disclosure have been described for the sake of brevity and clarity. Accordingly, one of ordinary skill would understand that the scope of the claimed invention is not limited by the explicitly described above embodiments but by the claims and equivalents thereof.

What is claimed is:

1. An image monitoring apparatus, comprising:
    a foreground/background separator configured to generate a foreground image by removing background pixels exhibiting no movement from pixels in an image and separating foreground pixels representing pixels of a moving object from the pixels in the image;
    a foreground object information generator configured to generate foreground object information containing (i) a coordinate value of each of one or more foreground objects included in the foreground image and (ii) the number of pixels of the foreground objects;
    a clustering unit configured to cluster the foreground object information into a plurality of groups;
    a singleton information detector configured to
        determine at least one group from the plurality of groups as a group of singletons and
        detect singleton information on the singletons; and
    a singleton estimation calculator configured to
        estimate a predetermined area calculation function using the singleton information and
        calculate at least one of estimates with respect to an area, a width and a height of each of the singletons.

2. The image monitoring apparatus of claim 1, further comprising:
    a denoiser configured to remove information identified as a noise from the foreground object information generated by the foreground object information generator.

3. The image monitoring apparatus of claim 2, wherein the denoiser is configured to
    generate a histogram for the number of pixels using the foreground object information, and
    remove the information identified as the noise, wherein the number of pixels corresponding to the noise is less than or equal to a predetermined reference value.

4. The image monitoring apparatus of claim 3, wherein the denoiser is configured to remove the information identified as the noise, wherein the number of pixels corresponding to the noise is within a preset range in the histogram.

5. The image monitoring apparatus of claim 2, wherein the denoiser is configured to determine, as a noise, an object having at least one edge of upper, lower, left and right edges cropped partially out of the foreground image, based on the coordinate value contained in the foreground object information, and remove the determined object as the noise.

6. The image monitoring apparatus of claim 1, wherein the foreground object information generator is configured to generate the foreground object information containing a coordinate of a centroid of a minimum bounding box for the foreground object or a coordinate of a point present at an edge of the minimum bounding box as the coordinate value.

7. The image monitoring apparatus of claim 1, wherein the foreground object information generator is configured to measure the coordinate value and the number of pixels contained in the foreground object information until the foreground object information reaches a predetermined reference data amount,
    wherein the coordinate value and the number of pixels are measured for a predetermined reference time.

8. The image monitoring apparatus of claim 1, wherein the clustering unit is configured to cluster the foreground object information into two groups using at least one of (i) an aspect ratio calculated using the foreground object information (ii) a fill ratio of the foreground object information and (iii) a second moment,
    wherein the two groups comprise a singleton group formed of the singletons and a plurality-of-objects group formed of multiple objects, and
    wherein the clustering unit is configured to cluster the foreground object information using at least one of a k-means clustering method, a hierarchical clustering method, a non-hierarchical clustering method and a model-based method.

9. The image monitoring apparatus of claim 1, wherein the singleton information detector is configured to determine at least one group from the plurality of groups as the group of singletons by using a value of at least one of image features including an aspect ratio calculated using the foreground object information, a fill ratio of the foreground object information and a second moment.

10. The image monitoring apparatus of claim 1, wherein the singleton information detector is configured to
    estimate a predetermined linear function for the foreground object information using a least-squares method, and
    calculate an error for the foreground object computed by using the predetermined linear function to determine the group of singletons.

11. The image monitoring apparatus of claim 10, wherein the singleton information detector is configured to
compute parameters for a y-intercept and a slope for the clustered foreground object information using the least-squares method, and
estimate the predetermined linear function proportional to y coordinates of predetermined foreground pixels.

12. The image monitoring apparatus of claim 11, wherein the singleton information detector is configured to
measure the number of pixels of the foreground object using the estimated predetermined linear function defined by the following equation:

$$a = p_1 + p_2 \times y,$$

wherein 'a' is an estimated number of pixels of the foreground object, $p_1$ is an a-intercept of the predetermined linear function, $p_2$ is the slope of the predetermined linear function, and y is the y coordinates of the foreground pixels.

13. The image monitoring apparatus of claim 10, wherein the error for the foreground object computed using the predetermined linear function is calculated using the following equation:

$$e_c = \frac{1}{N_c} \sum_{i=1}^{N_c} \{a_i - (p_1 + p_2 \times y_i)\}^2,$$

wherein $e_c$ is the error for the foreground object in relation to the number of pixels of the foreground object, $N_c$ is the number of foreground objects in group c, $a_i$ is an actual number of pixels of a corresponding one of the foreground objects, and $(p_1 + p_2 \times y_i)$ is the number of pixels of the corresponding one of the foreground objects estimated through the following equation:

$$M = \begin{vmatrix} \mu_{00} & \mu_{01} \\ \mu_{10} & \mu_{11} \end{vmatrix}$$
$$= \frac{1}{N} \begin{vmatrix} \sum (x-x_0)^2(x-x_0)^2 f(x,y) & \sum (x-x_0)^2(y-y_0)^2 f(x,y) \\ \sum (x-x_0)^2(y-y_0)^2 f(x,y) & \sum (y-y_0)^2(y-y_0)^2 f(x,y) \end{vmatrix}$$

wherein M denotes the second moment, μ denotes an average of coordinate values of the foreground pixels included in a foreground object, N denotes the number of pixels of the foreground object, (x, y) denotes the coordinates of pixels in the foreground image, and (x0, y0) denotes the coordinates of the centroid of the foreground object, and f(x, y) is 1 (foreground) or 0 (background), and
wherein foreground object information producing a smaller value of the error is determined to be the singleton information.

14. The image monitoring apparatus of claim 1, wherein the predetermined area calculation function estimated by the singleton estimation calculator using a nonlinear optimization technique is defined by the following equation:

$$a = p_{a1} + p_{a2} \times y^{p_{a3}},$$

wherein 'a' is an area of a singleton, $p_{a1}$ is an a-intercept of a predetermined nonlinear function, $p_{a2}$ is a coefficient of the predetermined nonlinear function, $p_{a3}$ is a curvature of the predetermined nonlinear function, and y is a y coordinate of the singleton.

15. The image monitoring apparatus of claim 1, wherein the singleton estimation calculator is configured to substitute a y coordinate value contained in the singleton information into the predetermined area calculation function to calculate the area of each of the singletons.

16. The image monitoring apparatus of claim 15, wherein the area of each of the singletons is calculated using the width and the height corresponding to a size of each of the singletons,
wherein a function for calculating the width is defined by the following equation:

$$w = p_{w1} + p_{w2} \times y^{p_{w3}},$$

wherein w is the width corresponding to the size of each of the singletons, $p_{w1}$ is a w-intercept of the function for calculating the width, $p_{w2}$ is a coefficient of the function for calculating the width, $p_{w3}$ is a curvature of the function for calculating the width, and y is a y coordinate of each of the singleton,
wherein a function for calculating the height is defined by the following equation:

$$h = p_{h1} + p_{h2} \times y^{p_{h3}},$$

wherein h is the height corresponding to the size of each of the singletons, $p_{h1}$ is an h-intercept of the function for calculating the height, $p_{h2}$ is a coefficient of the function for calculating the height, $p_{h3}$ is a curvature of the function for calculating the height, y is the y coordinate of each of the singletons.

17. The image monitoring apparatus of claim 1, further comprising:
a communicator configured to transmit the area calculated by the singleton estimation calculator to a monitoring unit such that the monitoring unit displays the singletons according to the area of each of the singletons.

18. A method performed by an apparatus for monitoring video images by estimating the size of an object, the method comprising:
capturing at least one image;
identifying a pixel value of at least one pixel in the captured image based on a predetermined criterion;
performing foreground image separation comprising:
separating foreground pixels from the captured image by removing background pixels designated based on the identified pixel value; and
generating a foreground image including the foreground pixels corresponding to at least one foreground object in the captured image;
generating foreground object information by measuring coordinate values of the foreground pixels and the number of pixels of the foreground object in the captured image;
clustering the foreground object information into a plurality of groups;
detecting singleton information on singletons by determining at least one group of the plurality of groups as a group for the singletons; and
performing a singleton estimation calculation comprising:
estimating a predetermined area calculation function using the singleton information, and
calculating at least one of estimates with respect to an area, a width and a height of each of the singletons using coordinate values contained in the singleton information.

19. The method of claim 18, wherein the generating of the foreground object information further comprises:
determining whether additional measurement of the coordinates of the foreground pixels and the number of pixels of the foreground object contained in the foreground object information is needed.

20. The method of claim 19, wherein the generating of the foreground object information comprises:
   generating a histogram for the foreground object information and removing a first noise contained within a preset range when the additional measurement for the foreground object information is not needed.

21. The method of claim 19, wherein the generating of the foreground object information comprises:
   removing, when a portion of the foreground object is not present in the foreground image, the foreground object from the foreground object information as a second noise.

22. The method of claim 18, wherein the clustering of the foreground object information into a plurality of groups comprises
   clustering the foreground object information into two groups by using at least one of (i) an aspect ratio calculated with the foreground object information, (ii) a fill ratio of the foreground object information and (iii) a second moment, wherein the two groups comprises a singleton group formed of the singletons and a plurality-of-objects group formed of multiple objects.

* * * * *